UNITED STATES PATENT OFFICE.

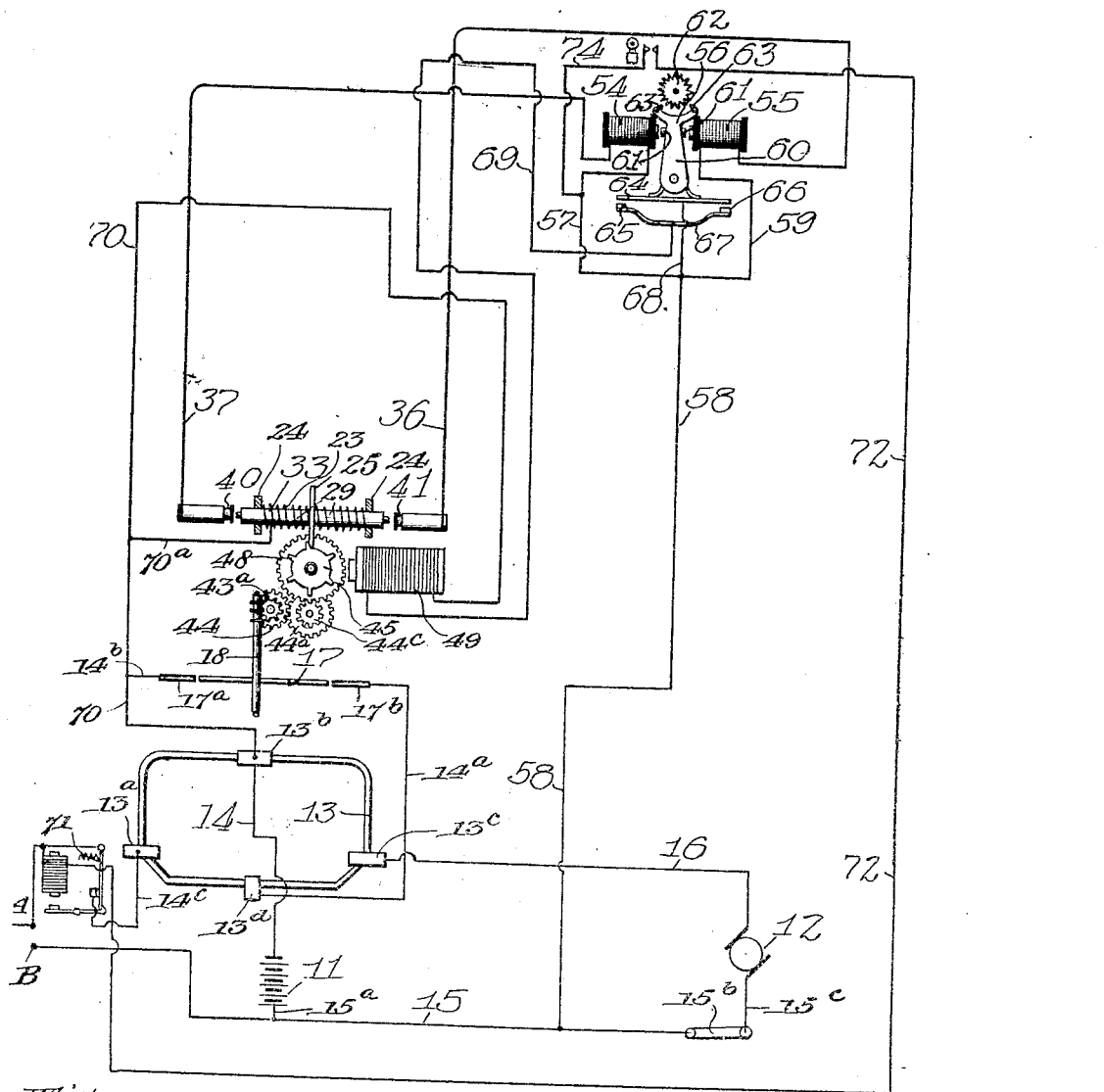

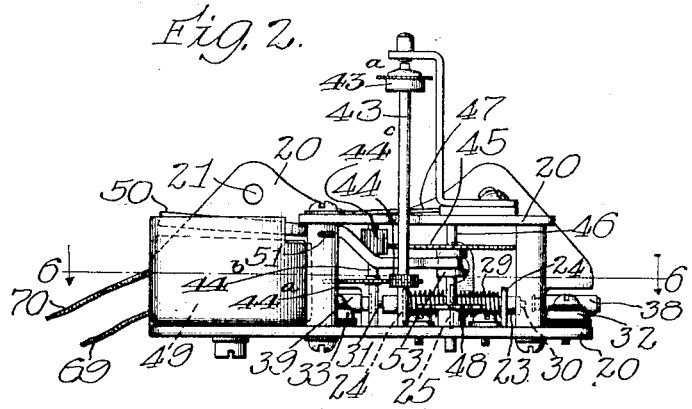
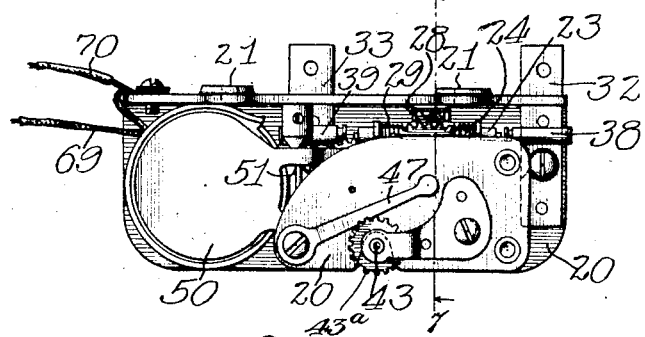
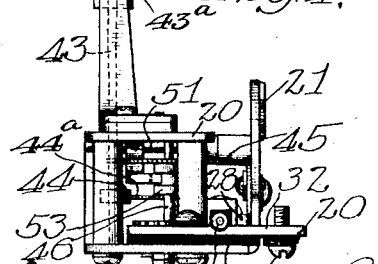

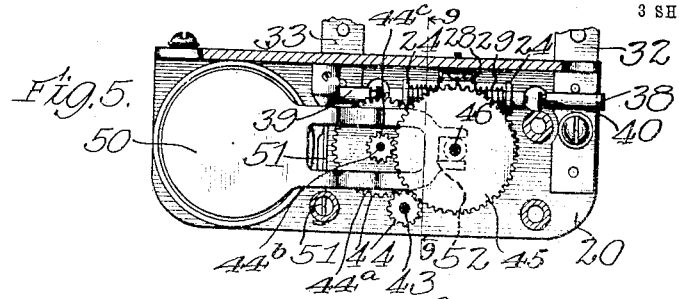
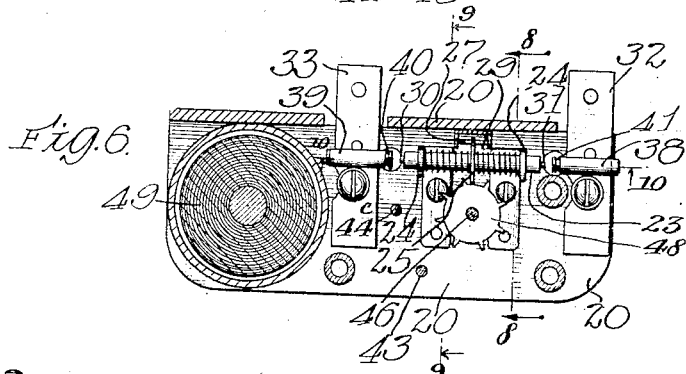
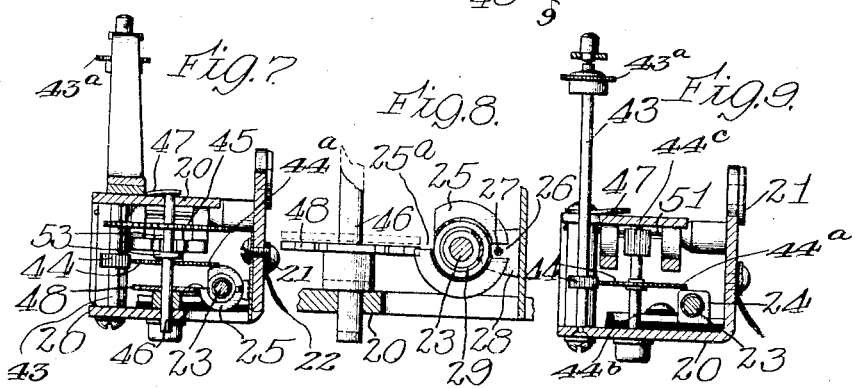
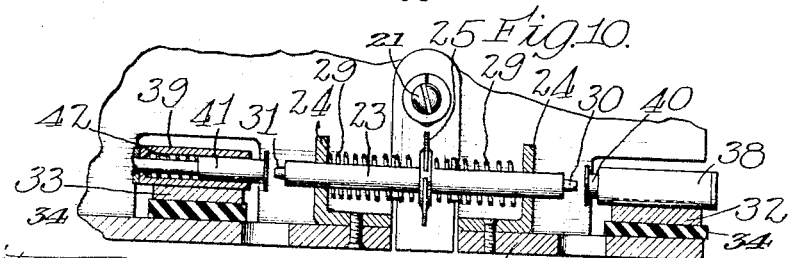

ROBERT C. LANPHIER AND KARL W. STRUCK, OF SPRINGFIELD, ILLINOIS, ASSIGNORS TO SANGAMO ELECTRIC COMPANY, OF SPRINGFIELD, ILLINOIS, A CORPORATION OF ILLINOIS.

MAKE-AND-BREAK MECHANISM FOR ELECTRIC CIRCUITS.

1,115,846.

Specification of Letters Patent. Patented Nov. 3, 1914.

Application filed July 1, 1912. Serial No. 707,067.

*To all whom it may concern:*

Be it known that we, ROBERT C. LANPHIER and KARL W. STRUCK, citizens of the United States, residing at Springfield, in the county of Sangamon and State of Illinois, have invented certain new and useful Improvements in Make-and-Break Mechanism for Electric Circuits, of which the following is a specification, reference being had to the accompanying drawings.

Our invention relates to mechanism for making and breaking electric circuits for the purpose of intermittently energizing electrically-operated devices, such as indicating mechanism, and has for its object to provide new and improved make and break mechanism adapted for use in connection with an electrically-operated controller, such as a meter, to operate an indicating device, such as the indicating hand of dial mechanism, to indicate the consumption of electrical energy.

A further object is to provide such a make and break mechanism which will be well adapted for use in connection with a reversible controller, such as a meter, the direction of rotation of the armature of which is controlled by the direction of flow of current through the meter, to actuate indicating mechanism in one direction or the other, depending upon whether the current is being supplied by the meter or to it.

It will be understood, of course, that while our improved make and break mechanism is designed more particularly for use for the purposes above mentioned, it may also be employed for any purpose to which it is adapted.

In the accompanying drawings, Figure 1 is a diagrammatic view illustrating our improved make and break mechanism connected up with a mercury motor meter which registers the discharge of the storage battery and also the current supplied to the battery when the same is being charged, the meter being provided with a differential shunt of the type shown and described in Letters Patent of the United States to Robert C. Lanphier, No. 958,508, dated May 17, 1910, so that the meter may be arranged to run at a different rate when the battery is being charged from that at which it runs when the battery is being discharged. Said figure also shows mechanism for operating an indicating hand in one direction or the other, depending on the direction of rotation of the meter; Fig. 2 is a front elevation of our improved mechanism; Fig. 3 is a top or plan view; Fig. 4 is an end view viewed from the right in Fig. 2; Fig. 5 is a plan view, some of the parts being removed; Fig. 6 is a horizontal section on line 6—6 of Fig. 2; Fig. 7 is a vertical cross-section on line 7—7 of Fig. 3; Fig. 8 is an enlarged detail, being a partial vertical cross-section on line 8—8 of Fig. 6; Fig. 9 is a vertical cross-section on line 9—9 of Fig. 6; and Fig. 10 is an enlarged detail, being a partial vertical longitudinal section showing the sliding contact bar and the end contacts which coöperate with them.

Referring to the drawings, 11 indicates a storage battery, 12 a translating device, such as a motor, and 13 the differential shunt of a meter of which 17 is the armature, and 18 the armature shaft, the latter being provided with a worm $18^a$ which engages a worm wheel $43^a$.

$17^a$—$17^b$ indicate terminals arranged at opposite sides of the armature 17, by which the current is led into and out of the usual mercury chamber in which the armature 17 rotates.

$13^a$, $13^b$, $13^c$ and $13^d$ indicate the contact blocks of the shunt 13, the contact block $13^d$ being a sliding member and being connected to the terminal $17^b$ by a wire $14^a$.

14 indicates a wire connecting the battery 11 with the contact block $13^b$, and 70 indicates a wire connecting the contact block $13^b$ with the terminal $17^a$, through a wire $14^b$.

16 indicates a wire connecting the contact block $13^c$ with the translating device 12.

15 and $15^a$ indicate wires connecting the battery 11 with a switch $15^b$, said switch being connected by a wire $15^c$ with the translating device 12.

A—B indicate line wires by which current may be supplied from a generator or other suitable source. As shown, the wire B is connected with the battery through wire $15^a$, the wire A being adapted to be connected with contact block $13^a$ of the differential shunt through a wire $14^c$, in which is interposed a suitable cut-out switch 71, of any approved type.

62 indicates a star-wheel which is connected by suitable train gears with the indicating hand of a dial register. Said starwheel is rotated in one direction or the other as circumstances require by a rocking arm 60 having pawls 63 arranged to engage and operate said star-wheel when said arm is rocked in either direction from its central or neutral position. 54—55 indicate electromagnets arranged at opposite sides of the arm 60 and adapted, when respectively energized, to swing the arm 60 in opposite directions from its central position. 64 indicates a contact-plate carried by the arm 60 and rocking therewith so as to engage a contact-plate 67 having contacts 65—66. This dial mechanism forms no part of our present invention, but is illustrated in the diagrammatic view given in Fig. 1 in order to show the manner in which our improved make and break mechanism may be employed to operate suitable indicating or registering devices. Such dial mechanism is illustrated and described in detail in an application filed by Robert C. Lanphier and Otis White, of even date herewith, Serial No. 707,065, which has been assigned to the assignee of our application.

The purpose of our improved make and break mechanism, which will now be described, is to control the energization of the magnets 54 and 55 and thereby effect the rotation of the indicator hand, in one direction or the other, in harmony with the operation of the meter. Thus when the meter is being operated to indicate the output of the storage battery 11, the make and break mechanism energizes one of the electro-magnets at intervals determined by the speed of the meter armature, and when the battery is being charged, said armature rotates in the opposite direction at a speed which measures the current supplied to the battery, and the make and break mechanism energizes the other electro-magnet to effect the rotation of the indicator hand in the opposite direction at a corresponding speed.

Referring now to the drawings for a more detailed description of our improved make and break mechanism,—20 indicates a suitable metallic supporting frame which is electrically connected with the meter-operating circuit, as will be hereinafter more particularly described.

23 indicates a slide-bar mounted in bearings provided in brackets 24 secured in the frame 20 and electrically connected therewith so that the slide-bar 23 is also in electrical connection with the frame 20 and through it with the meter-operating circuit. This is diagrammatically illustrated in Fig. 1, where the slide-bar 23 is shown connected to the wire 70 by a wire 70ª.

25 indicates a disk-like member or plate which is secured upon the slide-bar 23 centrally thereof, as best shown in Fig. 10. The member 25 is provided with a cutaway portion 25ª at its periphery and with a notch 26, as best shown in Fig. 8. The notch 26 embraces a bar 27, mounted in suitable supports 28, as shown in Figs. 5 and 6, so that said bar 27 serves to hold the disk 25 from rotating as the slide-bar moves endwise.

29 indicates springs mounted on the slide-bar 23 at opposite sides of the disk 25, their inner ends bearing against said disk, and their outer ends against the brackets 24, as shown in Fig. 10, so that they serve to hold the slide-bar normally in its neutral or central position.

30—31 indicate contacts at the ends of the slide-bar 23.

32—33 indicate metal supports which are secured to the frame 20 adjacent to the opposite ends of the slide-bar 23 and are insulated from said frame by plates 34. As shown in Fig. 4, the supports 32—33 are provided with binding screws 35 by which they may be connected to wires 36—37 which lead respectively to the electro-magnets 55—54.

38—39 indicate sleeves mounted on and electrically connected with the supports 32 and 33.

40—41 indicate contact pins which are mounted in the sleeves 38—39, respectively, so as to move longitudinally thereof. The contact pins 40—41 are arranged adjacent to the end portions of the slide-bar 23 and are normally projected toward said slide-bar by springs 42. The arrangement is such that when the slide-bar 23 is moved longitudinally in either direction, one or the other of its contacts 30—31 moves into engagement with the adjacent contact pin 40 or 41, as the case may be, thereby connecting one or the other of the wires 36—37 with the wire 70, and through it with the meter-operating circuits. When this takes place, the appropriate electro-magnet 54 or 55 is energized, the circuits being as follows: Assuming that the slide-bar 23 is moved to the left in the illustration given in Fig. 1, the current would flow from the battery 11 by wire 14 to wire 70; thence by wire 70ª to the slide-bar 23; thence through contact 40 to wire 37; thence through electro-magnet 54 to a wire 57 leading from said electro-magnet to a wire 58, which connects with wire 15, and thence through wire 15ª back to the battery. This will move the rocking arm 60 to the left and rotate the star-wheel 62 in a clockwise direction the space of one notch. When the slide-bar 23 moves to the right and strikes the contact pin 41, the electro-magnet 55 will be energized to swing the arm 60 to the right, thereby rotating the star-wheel 62 in the opposite direction the space of one notch. When this occurs the armature 17 of the meter will be rotating in a direction opposite to that in which it is rotated by the battery current, the current in this case being tently actuate said movable contact member to close the circuit, and means actuated by the closing of the circuit to move said actuating member out of operative relation to said movable contact member.

3. A make and break apparatus, comprising a pair of oppositely-disposed contact members, a movable contact member between said contact members and movable into engagement therewith to close one or the other of two electric circuits, an actuating device adapted to be operated to move the contact member into engagement with either of said first-mentioned contact members, and means actuated by the closing of either of said circuits for moving said actuating member out of operative relation to said movable contact member.

4. A make and break apparatus, comprising a pair of oppositely-disposed contact members, a movable contact member between said contact members and movable into engagement therewith to close one or the other of two electric circuits, a reversible rotary actuating member adapted to be operated to move the contact member into engagement with either of said first-mentioned contact members, and means actuated by the closing of either of said circuits for moving said actuating member out of operative relation to said movable contact member.

5. A make and break apparatus, comprising a contact member, a slide-bar movable into and out of engagement with said contact member, a plate carried by said slide-bar and moving therewith, a rotary actuating device adapted to engage said plate to move said slide-bar into engagement with said contact member, and means operated by the movement of said slide-bar into engagement with said contact member for disengaging said actuating device from said plate.

6. A make and break apparatus, comprising a contact member, a slide-bar movable into and out of engagement with said contact member, a plate carried by said slide-bar and moving therewith, a rotary actuating device adapted to engage said plate to move said slide-bar into engagement with said contact member, and an electro-magnet actuated by the movement of said slide-bar into engagement with said contact member for disengaging said actuating device from said plate.

7. A make and break apparatus, comprising oppositely-disposed contact members, a slide-bar disposed between said contact members and movable longitudinally to engage one or the other thereof, a plate carried by said slide-bar, and a star-wheel adapted when rotated to engage said plate to move said slide-bar into engagement with one or the other of said contact members.

8. A make and break apparatus, comprising oppositely-disposed contact members, a slide-bar disposed between said contact members and movable longitudinally to engage one or the other thereof, a plate carried by said slide-bar, a star-wheel adapted when rotated to engage said plate to move said slide-bar into engagement with one or the other of said contact members, and means for automatically disengaging said star-wheel from said plate on each actuation of said slide-bar.

9. A make and break apparatus, comprising oppositely-disposed contact members, a slide-bar disposed between said contact members and movable longitudinally to engage one or the other thereof, a plate carried by said slide-bar, a star-wheel adapted when rotated to engage said plate to move said slide-bar into engagement with one or the other of said contact members, and electro-magnetic means actuated by the closing of the circuit through either of said contact members for moving said star-wheel out of engagement with said plate.

10. A make and break apparatus, comprising a contact member, a slide-bar movable into engagement therewith, a plate carried by said slide-bar, said plate having a notch in its periphery, a star-wheel adapted to engage said plate to move said slide-bar into engagement with said contact member, and means for automatically moving said star-wheel into a position opposite the notched portion of said plate upon the closing of the circuit through said contact member.

11. A make and break apparatus, comprising a contact member, a slide-bar movable into engagement therewith, a plate carried by said slide-bar, said plate having a notch in its periphery, a star-wheel adapted to engage said plate to move said slide-bar into engagement with said contact member, and an electro-magnet actuated by the closing of the circuit through said contact member for moving said star-wheel into a position opposite the notched portion of said plate.

12. A make and break apparatus, comprising a pair of oppositely-disposed contact members, a slide-bar disposed between said contact members and movable into engagement with one or the other thereof, a notched plate carried by said slide-bar, a reversible star-wheel adapted to engage said plate to move said slide-bar in either direction, and means actuated by the closing of the circuit through either of said contact members for moving said star-wheel into a position opposite the notched portion of said plate.

13. A make and break apparatus, comprising a pair of oppositely-disposed contact members, a slide-bar disposed between supplied from the generator circuit as follows: By wire 14ᶜ to block 13ᵃ of the differential shunt; thence after passing through the differential shunt, to wire 70; thence by wire 70ᵃ to slide-bar 25, through contact pin 41 to wire 36; thence through electro-magnet 55 and by wire 59 to wire 58. At this time the switch 15ᵇ is open, so that the current passes over wire 15 to wire B. The meter is then operated in a reverse direction, the generator current flowing from terminal 17ᵇ to terminal 17ᵃ, after passing over wire 14ᵃ of the shunt, so that the armature is rotated at a slower rate than when it is rotated by the battery current.

The slide-bar 23 is moved longitudinally through suitable intermediate mechanism, by the rotation of the armature shaft 18, such intermediate mechanism being as follows: 48 indicates a star-wheel mounted on a shaft 46 in such position that its teeth are adapted to engage the disk 25 as said star-wheel rotates. The shaft 46 is what is known as a "kick" shaft, being mounted to move longitudinally in its bearings and being held down in normal position by a spring 47 which bears upon its upper end, as shown in Fig. 7. The normal position of the star-wheel 48 is best shown in full lines in Fig. 8, from which it will be seen that it lies adjacent to the cut-away portions 25ᵃ of said disk in such position that when the shaft 46 is lifted to the position shown in dotted lines in Fig. 8, the star-wheel 48 is carried up so that its teeth register with the cut-away portion 25ᵃ, thereby permitting the disk 25 to move freely past said star-wheel. When the parts are in their normal position, when said star-wheel rotates in either direction its teeth engage the disk 25 and move the slide-bar 23 endwise so as to bring one or the other of its contacts into engagement with the opposing contact pin. The star-wheel 48 is connected to the worm 18ᵃ of the meter through a pinion 44 mounted on a shaft 43 and meshing with a gear 44ᵃ mounted on a shaft 44ᵇ, said shaft carrying a pinion 44ᶜ, which meshes with a gear 45 mounted on the kick shaft 46. The shaft 43 carries the worm wheel 43ᵃ which is driven by the worm 18ᵃ on the armature shaft 18. Obviously, the train of gears illustrated is merely an exemplification of a construction that may be employed for the purpose.

The kick shaft 46 is moved endwise to carry the star-wheel 48 into inoperative position and thereby permit the slide-bar 23 to return to its neutral position after each contact is made, by means of an electro-magnet 49, having an armature 50 in the form of a lever or bar, mounted intermediately upon a pivot 51 so that it may rock to permit the armature 50 to move toward or away from its electro-magnet. The opposite end of the armature bar is forked, as shown at 52 in Fig. 5, the fork fitting into the groove of a sleeve 53 carried by the kick shaft 46, the arrangement being such that when the armature 50 is drawn toward its magnet, the kick shaft is moved endwise far enough to carry the star-wheel 48 out of operative position. The magnet 49 is energized whenever the swinging arm 60 is actuated by means of the contact arms 64—67 which act to close the circuit through the winding of said electro-magnet whenever said swinging arm 60 is actuated by either of the electro-magnets 65—55. In the illustration given in Fig. 1, the contact bar 64 is connected to wire 58, and the contact-bar 67 is connected to the coil of the magnet 49 by a wire 69, the opposite terminal of said coil being connected to wire 70. The energizing circuit for the magnet 49 will be apparent from the description hereinbefore given with regard to the circuits and need not be explained in detail. The object of mounting the contact pins 40—41 yieldingly is to permit the slide-bar 23 to move far enough in either direction when actuated by the star-wheel 48 so that in case the magnet 49 should not act to move said star-wheel out of operative position, the slide-bar 23 can move far enough to permit the disk 25 to disengage the actuating tooth of the star-wheel, and thereby prevent breakage. This operation, however, is only an emergency provision, and is not intended to be employed in normal operation.

While our improved make and break mechanism is designed for use in situations where a double action is needed, it may also be employed in connection with apparatus in which only a single circuit is made and broken.

We have described with considerable particularity the illustrated embodiment of our invention, but we wish it to be understood that except as particularly claimed, our invention is not restricted to the specific details of the construction shown and described, but includes generically the subject-matter of the broader claims.

What we claim as our invention, and desire to secure by Letters Patent, is,—

1. A make and break apparatus, comprising a pair of contact members, one of said contact members being movable into engagement with the other to close a circuit, an actuating member adapted to intermittently actuate said movable contact member to close the circuit, and means actuated by the closing of the circuit to move said actuating member out of operative relation to said movable contact member.

2. A make and break apparatus, comprising a pair of contact members, one of said contact members being movable into engagement with the other to close a circuit, a rotary actuating member adapted to intermitsaid contact members and movable into engagement with one or the other thereof, a notched plate carried by said slide-bar, a kick shaft, a star-wheel mounted on said kick shaft and adapted normally to engage said plate and by its rotation move said slide-bar into contact with either of said contact members, and an electro-magnet actuated by the closing of the circuit through either of said contact members for moving said kick shaft endwise to move said star-wheel into a position opposite the notched portion of said plate.

14. A make and break apparatus, comprising a yieldingly mounted contact member, a slide bar movable into engagement with said contact member, a plate carried by said slide-bar, and a star-wheel adapted by its rotation to engage said plate and move said slide-bar into engagement with said contact member.

ROBERT C. LANPHIER.
KARL W. STRUCK.

Witnesses:
ARABEL MARTIN,
J. A. SCHMENZ.